United States Patent [19]
Krieg et al.

[11] Patent Number: 4,894,650
[45] Date of Patent: Jan. 16, 1990

[54] CONTROL UNIT FOR MANUALLY CONTROLLING REVERSIBLE ELECTROMECHANICAL ADJUSTING DEVICES

[75] Inventors: Karl-Heinz Krieg, Ebersbach; Siegfried Klink, Schönaich, both of Fed. Rep. of Germany

[73] Assignee: Daimler-Benz AG, Stuttgart, Fed. Rep. of Germany

[21] Appl. No.: 203,319

[22] Filed: Jun. 2, 1988

[30] Foreign Application Priority Data

Jun. 27, 1987 [DE] Fed. Rep. of Germany ....... 3721267

[51] Int. Cl.$^4$ .............................................. H04Q 1/00
[52] U.S. Cl. .................................. 340/825.52; 200/4; 200/5 B
[58] Field of Search .................... 350/637; 340/825.52; 318/257, 258, 543; 200/51 R, 51.03, 50.04, 51.06, 61.39, 5 R, 5 B, 4

[56] References Cited
U.S. PATENT DOCUMENTS
4,273,971 6/1981 Tregurtha .................................. 200/4
4,428,649 1/1984 Main et al. ........................... 200/4 X

FOREIGN PATENT DOCUMENTS
0186192 7/1986 European Pat. Off. .
2506073 8/1976 Fed. Rep. of Germany .
3609688 9/1986 Fed. Rep. of Germany .
3524439 1/1987 Fed. Rep. of Germany .
1372453 8/1964 France .
2507982 6/1981 France .

Primary Examiner—Ulysses Weldon

[57] ABSTRACT

A control unit for manually controlling six reversible electromechanical adjusting devices utilizing a single joy stick actuator which is rotatable to two positions from a neutral position tiltable in a first direction to two other positions from the neutral position and tiltable at right angles to the first direction to two further positions from the neutral position. At each of the six positions various switches are either opened or closed to provide a binary code output which is fed to a decoding and control circuit which operates selected one(s) of the six adjusting devices. In this manner three rear-view mirrors on a vehicle can be properly positioned by two adjusting devices rotating the mirrors along a right angled axis.

10 Claims, 3 Drawing Sheets

CONTROL UNIT FOR MANUALLY CONTROLLING REVERSIBLE ELECTROMECHANICAL ADJUSTING DEVICES

BACKGROUND AND SUMMARY OF THE INVENTION

The invention relates to a control unit for manually controlling at least four reversible electromechanical adjusting means used for adjusting the position of at least three motor vehicle rear view mirrors, comprising: a switch arrangement means moved by a single lever means for positioning a first selecting switch movable contact bridge means which rests against a first fixed contact in one of three switching positions and against a second fixed contact in another of said switching positions, and for also positioning three key switch means wherein at least a first and a second of these key switch means are change-over key switch means having one moveable contact bridge each which can be switched to a first or to a second fixed contact depending on the direction of movement of the lever; the moveable contact bridge of the first change-over key switch means being electrically and permanently connected to the moveable contact bridge of the selecting switch means and moved jointly with at least one other moveable contact bridges of one of the other two switch means; said third change-over key switch means also having a moveable contact bridge and a first fixed contact, and a common connecting terminal which is electrically and permanently connected to each of the fixed contacts of each of three key switch means. Four further connecting terminal means are electrically and permanently connected with the first terminal being connected to the first fixed contact of the selecting switch means, the second terminal connected to the second fixed contact of the selecting switch means, the third terminal connected to the moveable contact bridge means of the second key switch means and the fourth terminal connected to the moveable contact bridge means of the third key switch means.

A control unit is known (FIG. 1) which is used for selecting one of two remotely controlled adjustable rear view mirrors and for manually controlling two reversible electrical adjusting devices provided in each mirror by means of a lever handle in the manner of a short joy stick. The mirror is selected by rotating the lever handle from a stable neutral position into a right-hand or a left-hand switching position corresponding to the position of the outside rear view mirror to be selected.

The adjusting devices are manually controlled by tilting the lever handle from a stable central position towards the front or the rear against a centering restoring force to pivot the mirror around its horizontal axis, or to the right or left to pivot the mirror around its vertical axis.

Such control switch units are already known for adjusting a single outside rear view mirror on the passenger side.

Finally, a mirror adjusting switch with selecting possibility for two different rear view mirrors is also known from EP-A 0,186,192, in which, however, the mirror selection and the manual control of the adjusting devices are effected by means of two mechanically independent handles.

Such mirror adjusting switches are generally installed in the center consoles of passenger cars and must take up valuable space there.

It is already known to store both seat and rear view mirror positions with a memory circuit so that they can be called up by pressing a button. This also requires multiple adjustments by external force when up to three rear view mirrors, two arranged on the outside and one on the inside, are involved such as for example in station wagons.

The invention is based on the object of developing a control unit of the single joy stick type in such a manner that the manual control of the two adjusting devices in each of three rear view mirrors is made possible with the most compact form possible and the least possible number of electrical connections and with a compact arrangement to be housed in a confined space. According to the invention, this object is achieved by means of the moveable contact bridge means of the selecting switch means of the switch arrangement means, in its third switching position electrically connecting the first and second fixed contact of the selecting switch, while all of the fixed contacts of the key switches are connected to a common ground connection and wherein the four further connecting terminal means are connected to a spatially remotely arranged decoding and control circuit via a multi-core line for transmitting a four-digit binary code with the symbols "no potential" and "potential of the common connecting terminal" to said decoding and control circuit. Each adjusting means is addressed in a required adjusting direction by two digits of the binarY code from said decoding and control circuit, wherein the first two connecting terminal means, connected to the two fixed contacts of the selecting switch means, determine which of the three rear view mirrors are to be adjusted while the third and fourth connecting terminal means, connected to the contact bridges of the second and third key switch means, determines which directions the mirrors are to be adjusted by said adjusting means and wherein the decoding and control circuit operates the adjusting means via control lines in accordance with the binary code caused by the lever handle actuating the three key switch means.

By dividing the control unit into a switch arrangement for the center console and a decoding and control circuit which is installed at a remote position from the switch arrangement and which is electrically connected to the switch arrangement by means of a multi-core control line, which transmits at least a four-digit binary code which addresses: the individual mirrors, the respective adjusting device, and their required adjusting direction, the constructional size of the control unit can be retained unchanged compared with the known control unit and the number of connecting terminals needed for the manual control of the adjusting devices at the switch arrangement can even be limited to five.

The invention also contemplates that the decoding and control circuit of the control unit for selectively adjusting the position of each of three mirrors by use of a single joy stick also has connected with it the well known memory control system for preselection of a previously determined mirror adjustment.

Also an indicator and indicator light (for night time usage) is provided to indicate which of the three mirrors to be adjusted is being addressed.

Still further the joy stick can have a pointer shape configuration (tear-drop) wherein the position of the selected mirror to be adjusted can be felt by the human touch.

These and other objects, features, and advantages of the present invention will become apparent from the following description when taken in connection with the accompanying drawings which sow, for the purposes of illustration only, one embodiment in accordance with the present invention, and wherein:

DETAILED DESCRIPTION OF THE DRAWINGS

Figure 1:
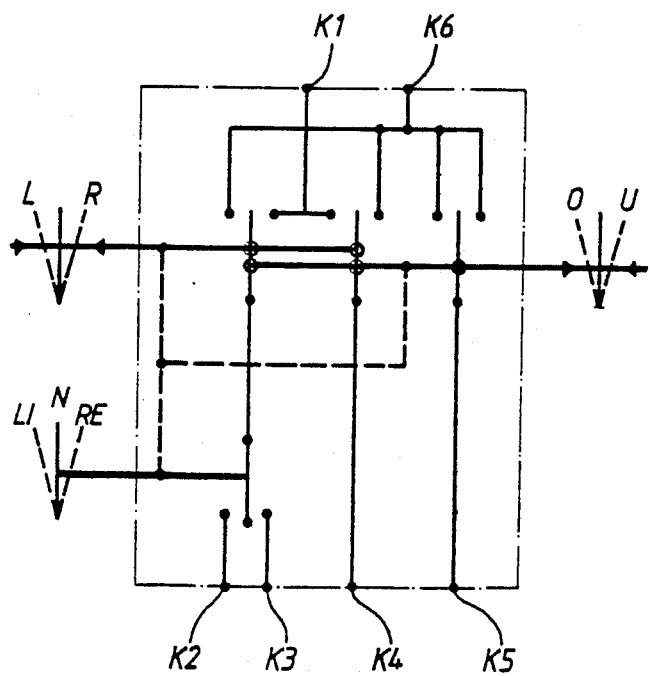
FIG. 1 shoes a circuit diagram of the known control unit (prior art)

Referring now to the drawings wherein like reference numerals are used to designate like parts and more particularly to the known prior art control unit according to FIG. 1, six connecting terminals K1, K2, K3, K4, K5 and K6 are provided along with a selecting switch having three stable switch positions: RE, N, LI, wherein a switch contact is moveable to connect RE to terminal K2,
LI to terminal K3, or
N to neither of the two terminals.

In addition, three change-over key switches, having one movable contact bridge, two fixed contacts and one neutral center position each, are provided.

The contact bridge of the first change-over key switch, shown on the left in FIG. 1, is electrically permanently connected to the contact bridge of the selecting switch.

One fixed contact each (both of the first change-over key switch and of the second change-over key switch—switch in the center) is connected to terminal K1, while in each case the second fixed contact of the first and of the second change-over key switch and both fixed contacts of the third change-over key switch—shown on the right—are jointly connected to the connecting terminal K6.

The contact bridge of the second change-over key switch is permanently connected to the connecting terminal K4 and the contact bridge of the third change-over key switch is permanently connected to the connecting terminal K5.

At the cylindrically-shaped lever handle and at the socket of the known control unit/switch arrangement, color markings are provided for visually identifying the position of the lever handle—RE, N, LI—and of the selecting switch.

Figure 2:
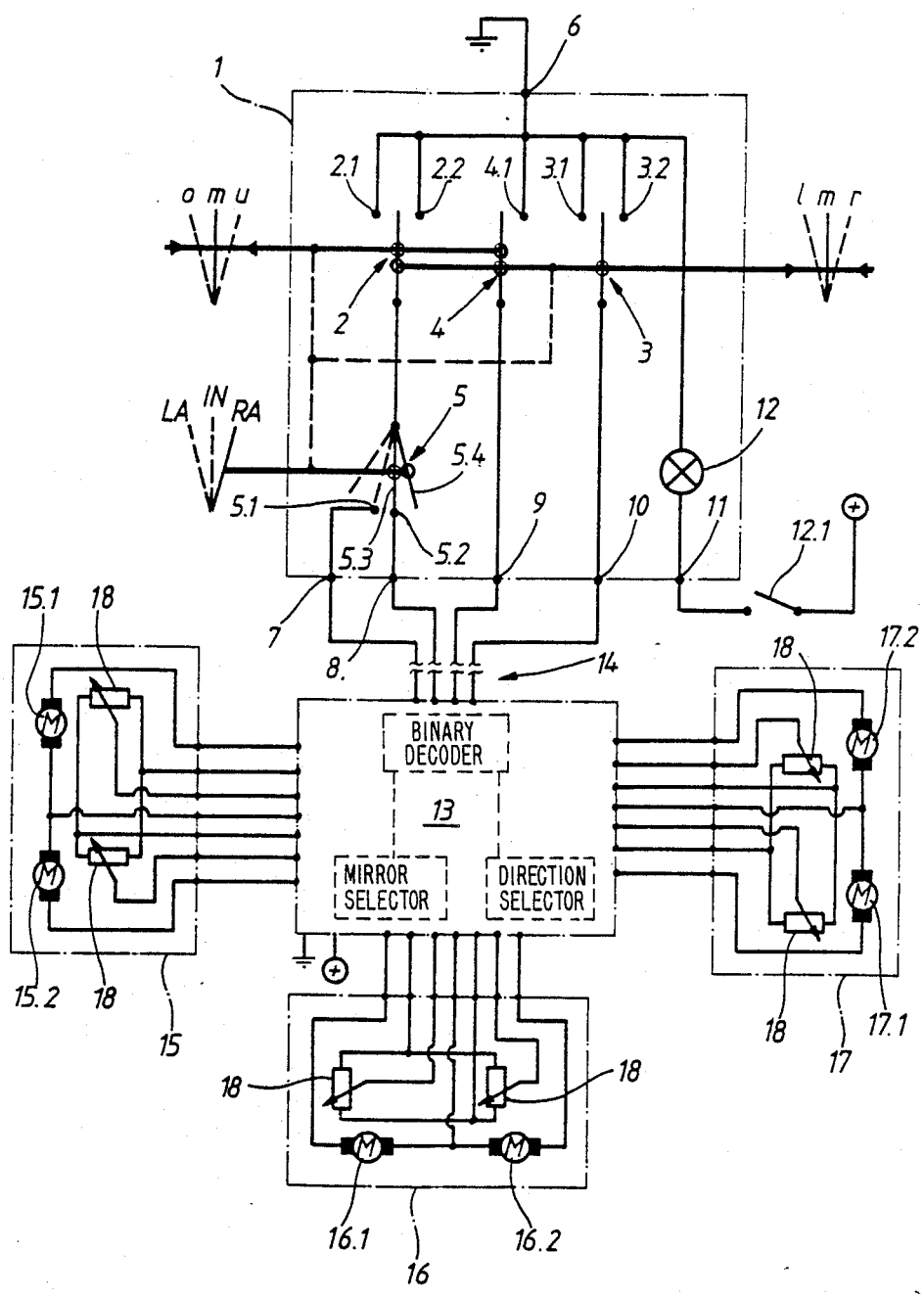
FIG. 2 shows a circuit diagram of the control unit according to the invention.

As can be seen from the circuit diagram of FIG. 2, the control unit according to the invention consists of a switch arrangement 1, having a first key switch 2 which is constructed as change-over key switch with a first fixed contact 2.1 and a second fixed contact 2.2. A second change-over key switch 3 is provided with a first fixed contact 3.1 and a second fixed contact 3.2. Both the first key switch 2 and the second key switch 3 are shown with their movable contact bridge in a neutral center position and have a third key switch 4 with a fixed contact 4.1. A selecting switch 5 is provided which can assume three stable switching positions RA, IN, LA, and has a first fixed contact 5.1 and a second fixed contact 5.2. The moveable contact bridge of selection switch 5 is formed from two mechanically coupled moveable contact members 5.3 and 5.4 which are both permanently and electrically connected to the moveable contact bridge of the first change-over key switch 2. A common ground terminal 6 is connected to all fixed contacts 2.1, 2.2, 3.1, 3.2 and 4.1 and the three key switches 2, 3 and 4 have their moveable contact bridge electrically connected to four further connecting terminals 7 or 8, 9, and 10, respectively.

Terminal 7 is electrically connected to the first fixed contact 5.1 of the selecting switch 5. Terminal 8 is electrically connected to the second fixed contact 5.2 of the selecting switch. Terminal 9 is electrically connected to the contact bridge of the third key switch 4 and Terminal 10 is electrically connected to the contact bridge of change-over key switch 3.

A connecting terminal 11 is connected to a light switch 12.1 to provide an electrical connection of a light source 12 to the common connecting terminal 6 through terminal 11.

Figure 3:
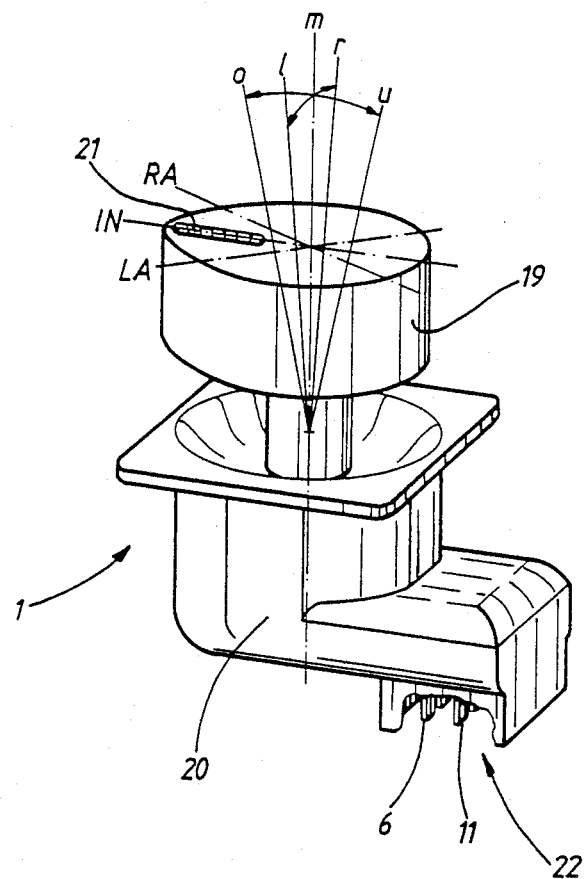
FIG. 3 shows a part view of a switch arrangement.

The dashed connecting lines in FIGS. 1 and 2 between the three handles of each switch are shown for the sake of clarity and symbolically indicate their actual combination in one single lever handle 19, two axis joy stick, which is shown in FIG. 3. A decoding and control circuit 13 is provided and is connected via a four-core line 14 to the four connecting terminals 7 to 10 of the switch arrangement 1.

Furthermore, three rear view mirrors 15, 16 and 17 are diagrammatically shown, each of which is equipped with two adjusting devices 15.1, 15.2; 16.1, 16.2; 17.1, 17.2 and two position return potentiometers 18 which are connected via control lines to the decoding and control unit 13.

The two moving contact members 5.3 and 5.4 are actuated by rotating the lever handle 19 of the joy stick about its longitudinal axis (m) (see FIG. 3). In position RA ("right-hand outside mirror", shown as a continuous line in FIG. 2) of the key switch 5, only the moveable contact member 5.3 rests against the fixed contact 5.2 and moveable contact 5.4 is clear of any fixed contact. In position IN ("interior mirror", shown as a dashed line), the moveable contact member 5.3 rests against the fixed contact 5.1 and the moveable contact member 5.4 against the fixed contact 5.2. In position LA ("left-hand outside mirror" also shown as a dashed line), only the contact member 5.4 rests against the fixed contact 5.1. The moveable contact 5.3 is clear of any fixed contact.

By tilting the lever handle 21 left or right as shown in FIG. 3, the longitudinal axis of which is at least approximately vertical in the installed position in the vehicle, from the center position m (continuous line FIG. 2) to the "0" position, the first moveable contact of the first key switch 2 is connected to the fixed contact 2.1 and the moveable contact of third key switch 4 is moved to be clear of any fixed contact. When the handle 21 is tilted to the "u" position, the moveable contact of the first key switch 2 is connected to the fixed contact 2.2 and the moveable contact of third key switch 4 is connected to the fixed contact 4.1. By tilting the lever handle 21 fore or aft as shown in FIG. 3 to the "1" position, the moveable contact of first key switch 2 is connected to the fixed contact 2.1, the moveable contact of second key switch 3 is connected to the fixed contact 3.1 and the moveable contact of the third key switch 4 is also moved to be clear of any fixed contact. When the lever handle 21 is tilted to the "R" position, the moveable first key switch 2 is connected to the fixed contact 2.2, the moveable contact of the second key switch 3 is connected to the fixed contact 3.2 and the moveable contact of third key switch 4 is connected to fixed contact 4.1.

Assuming that a negative potential is present at the common connecting terminal 6, the following possible combinations are produced, listed in the form of a table, for the binary code present at the four connecting terminals 7–10, with the "—" symbol for negative potential and "0" for "no potential":

| Rotative position of the lever handle (LA, IN, RA) and tilted position (o, u, l, r) | Terminal Number | | | |
|---|---|---|---|---|
| | 7 | 8 | 9 | 10 |
| LA/o | — | 0 | 0 | 0 |
| /u | — | 0 | — | 0 |
| /l | — | 0 | 0 | — |
| /r | — | 0 | — | — |
| /m | 0 | 0 | 0 | 0 |
| IN/o | — | — | 0 | 0 |
| /u | — | — | — | 0 |
| /l | — | — | 0 | — |
| /r | — | — | — | — |
| /m | 0 | 0 | 0 | 0 |
| RA/o | 0 | — | 0 | 0 |
| /u | 0 | — | — | 0 |
| /l | 0 | — | 0 | — |
| /r | 0 | — | — | — |
| /m | 0 | 0 | 0 | 0 |

The twelve permutations, apart from the zero "m" position, are sufficient for enabling the decoding and control device 13 to determine the direction of adjustment of one of the six adjusting devices 15.1, 15.2, 16.1, 16.2, 17.1, 17.2 required in each case.

FIG. 3 shows the switch arrangement 1 in a perspective view. The lever handle 19 is mounted at a socket 20 so as to be rotatable about an axis m into three stable switching positions RA, IN, LA and to be tiltable from the axis m into tilted Positions o–u and l–r into two planes which are perpendicular to one another. The lever can have a pointer shape configuration (tear-drop) by means of which its respective switching position can be felt.

In addition, an elongated window panel 21 is provided in the upper face of the lever handle 19 which is illuminated by the light source 12 (FIG. 2), for example after the vehicle parking light has been switched on, and visually identifies the switching position of the lever handle even in darkness. A supply and control line which contains the four-core line 14 (FIG. 2) to the decoding and control circuit 13 (FIG. 2) is connected to a multi-pin connector 22 which contains all connecting terminals 6 to 11.

All moveable contact bridges of the switch arrangements according to FIG. 1 and 2 are constructed as dumbell-switching bars (not shown). They are held in guide elements coupled to the lever handle and pressed by springs onto a circuit board having plated contact tracks corresponding to the drawn connections and fixed contacts as is well known.

The contact tracks for the key switches and the contact tracks for the selecting switch extend on the two opposite sides of the circuit board.

A switching bar is only electrically decoupled from a movement of the lever handle in that, although it is mechanically carried along, it remains on the same contact track with both contact points in the direction of movement without establishing a connection between two different contact tracks.

While we have shown and described only one embodiment in accordance with the present invention, it is understood that the same is not limited thereto but is susceptible to numerous changes and modifications as known to open having ordinary skill in the art, and we therefore do not wish to be limited to the details shown and described herein, but intend to cover all such modifications as are encompassed by the scope of the appended claims.

We claim:

1. A control unit for manually controlling reversible electromechanical adjusting means used for adjusting the position of three motor vehicle rear view mirrors, comprising:

a switch arrangement means moved by a single moveable lever means for positioning a first selecting switch means movable contact bridge means which rests against a first fixed contact in one of three switching positions and against a second fixed contact in another of said switching positions;

and for also positioning three key switch means wherein at least a first and a second of these key switch means are change-over key switch means having one moveable contact bridge each, which can be switched to a first or to a second fixed contact depending on a direction of movement of the lever;

the moveable contact bridge of the first change-over key switch means being electrically and permanently connected to the moveable contact bridge of the selecting switch means and moved jointly with a least one other moveable contact bridge of one of the other two switch means;

said third key switch means also having a moveable contact bridge and a first fixed contact;

a common connecting terminal which is electrically and permanently connected to each of the fixed contacts of each of three key switch means;

four further connecting terminal means which are individually and permanently connected, with the first of the four further connecting terminal means being connected to the first fixed contact of the selecting switch means, the second of the four further connecting terminal means connected to the second fixed contact of the selecting switch means, the third of the four further connecting terminal means connected to the moveable contact bridge means of the second key switch means and the fourth of the four further connecting terminal means connected to the moveable contact bridge means of the third key switch means;

the moveable contact bridge means of the selecting switch means of the switch arrangement means, in its third switching position electrically connects the first and second fixed contact of the selecting switch together;

the four further connecting terminal means each being connected to a spatially remotely arranged decoding and control circuit via a multi-core line for transmitting a four-digit binary code with the symbols "no potential" and "potential of the common connecting terminal" to said decoding and control circuit, each adjusting means is addressed in a required adjusting direction by two digits of the binary code from said decoding and control circuit; wherein the first two connecting terminal means connected to the two fixed contacts of the selecting switch means determine which one of the three rear view mirrors is to be adjusted while the third and fourth connecting terminal means connected to the contact bridges of the second and third key switch means determine which directions the mirrors are to be adjusted by said adjusting means; and wherein the decoding and control circuit operates the adjusting means via control lines in accordance with the binary code therein caused by the lever handle actuating the three key switch means.

2. A control unit according to claim 1, wherein an optical identification of the switching position of the first selection switch means moved by the lever handle is provided by a sixth connecting terminal means of the switch arrangement connected between an electrical potential which is opposite to the potential of the common connecting terminal after actuation of a light switch means, through a light source and wherein said light source shines through a window panel in the lever handle, indicating said switching position of said first selection switch means.

3. A control unit according to claim 1, wherein an optical identification of the switching position of the first selection switch means moved by the lever handle is provided by a sixth connecting terminal means of the switch arrangement connected between an electrical potential which is opposite to the potential of the common connecting terminal means after actuation of a light switch means, through a light source; and wherein said light source shines through a window panel in the lever handle, indicating said switching position of said first selection switch means.

4. A control unit according to claim 1, comprising identification of the switch position of the lever handle by having the lever handle constructed in the shape of a pointer which enables its switching position and the switching position of the selecting switch means to be identified by touching.

5. A control unit according to claim 1, comprising identification of the switch position of the lever handle by having the lever handle constructed in the shape of a pointer which enables its switching position and the switching position of the selecting switch means to be identified by touching.

6. A control unit according to claim 2, comprising identification of the switch position of the lever handle by having the lever handle constructed in the shape of a pointer which enables its switching position and the switching position of the selecting switch means to be identified by touching.

7. A control unit according to claim 3, comprising identification of the switch position of the lever handle by having the lever handle constructed in the shape of a pointer which enables its switching position and the switching position of the selecting switch means to be identified by touching.

8. A control unit according to claim 1 wherein the moveable contact bridge means of the selecting switch means consists of two mechanically coupled movable contact members which always have the same electrical polarity.

9. A control unit according to claim 2, wherein the moveable contact bridge means of the selecting switch means consists of two mechanically coupled movable contact members which always have the same electrical polarity.

10. A control unit according to claim 3, wherein the moveable contact bridge means of the selecting switch means consists of two mechanically coupled movable contact members which always have the same electrical polarity.

* * * * *